(12) United States Patent
Guo

(10) Patent No.: US 11,303,761 B2
(45) Date of Patent: Apr. 12, 2022

(54) SERVICE DATA FLOW PROCESSING METHOD AND RELATED DEVICE

(71) Applicant: HUAWEI TECHNOLOGIES CO., LTD., Guangdong (CN)

(72) Inventor: Jiancheng Guo, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/931,146

(22) Filed: Jul. 16, 2020

(65) Prior Publication Data

US 2020/0351410 A1 Nov. 5, 2020

Related U.S. Application Data

(63) Continuation of application No. PCT/CN2019/071851, filed on Jan. 16, 2019.

(30) Foreign Application Priority Data

Jan. 17, 2018 (CN) .......................... 201810046643.8

(51) Int. Cl.
*H04M 15/00* (2006.01)
*H04L 12/14* (2006.01)
*H04W 28/10* (2009.01)

(52) U.S. Cl.
CPC ........ *H04M 15/66* (2013.01); *H04L 12/1407* (2013.01); *H04W 28/10* (2013.01); *H04M 15/8214* (2013.01)

(58) Field of Classification Search
CPC .............. H04M 15/66; H04M 15/8214; H04L 12/1407; H04W 28/10
See application file for complete search history.

(56) References Cited

U.S. PATENT DOCUMENTS

| 2008/0229385 A1* | 9/2008 | Feder ..................... H04L 12/66 726/1 |
| 2011/0090801 A1 | 4/2011 | Oku et al. |
| 2012/0218888 A1 | 8/2012 | Cutler et al. |
| 2014/0219230 A1* | 8/2014 | Schierl .................. H04W 72/08 370/329 |

(Continued)

FOREIGN PATENT DOCUMENTS

| CN | 103582171 A | 2/2014 |
| CN | 106900022 A | 6/2017 |

(Continued)

*Primary Examiner* — Khai M Nguyen
(74) *Attorney, Agent, or Firm* — Womble Bond Dickinson (US) LLP

(57) ABSTRACT

Embodiments of this application provide a service data flow processing method for an idle state to reduce a data traffic fee corresponding to the service data flow. The method in the embodiments of this application can include obtaining a service data flow, where the service data flow is a data flow sent by a server to user equipment (UE) through a default bearer, and the default bearer is a bearer set up when a public data network (PDN) connection between the server and the UE is in a connected state. The method may also include determining that an uplink network connection between the UE and the server is in an idle state, and preventing sending of the service data flow, or charging for the service data flow according to a preset charging mode.

12 Claims, 5 Drawing Sheets

(56) References Cited

U.S. PATENT DOCUMENTS

| | | | |
|---|---|---|---|
| 2016/0219644 A1 | 7/2016 | Zhao et al. | |
| 2016/0302101 A1* | 10/2016 | Bolle et al. | |
| 2017/0041968 A1* | 2/2017 | Jin | H04W 76/27 |
| 2017/0155772 A1* | 6/2017 | Chong | H04W 4/24 |
| 2017/0230512 A1* | 8/2017 | Yu | H04M 15/66 |
| 2021/0136658 A1* | 5/2021 | Ronneke | H04W 48/06 |

FOREIGN PATENT DOCUMENTS

| | | |
|---|---|---|
| CN | 107197482 A | 9/2017 |
| CN | 103875302 B | 10/2017 |
| CN | 107453917 A | 12/2017 |
| EP | 3116284 A1 | 1/2017 |
| JP | 2007060145 A | 3/2007 |
| JP | 2012222378 A | 11/2012 |
| JP | 2015523819 A | 8/2015 |
| JP | 2017526277 A | 9/2017 |
| WO | 2009123265 A1 | 10/2009 |

* cited by examiner

SERVICE DATA FLOW PROCESSING METHOD AND RELATED DEVICE

CROSS-REFERENCE TO RELATED APPLICATIONS

This application is a continuation of International Application No. PCT/CN2019/071851, filed on Jan. 16, 2019, which claims priority to Chinese Patent Application No. 201810046643.8, filed on Jan. 17, 2018. The disclosures of the aforementioned applications are hereby incorporated by reference in their entireties.

TECHNICAL FIELD

This application relates to the communications field, and in particular, to a service data flow processing method and a related device.

BACKGROUND

In a 3rd generation partnership project (3GPP) standard protocol, user equipment (UE) communicates with a server through data transmission. The user equipment sends uplink data to the server, and the server responds by sending downlink data. In a Long Term Evolution (LTE) system, a public data network (PDN) connection is set up in a process in which UE attaches to a network. The PDN connection is an internet protocol (IP) connection between the UE and an evolved packet core (EPC). The PDN connection triggers the UE to set up a default bearer with the network, and the IP connection is not interrupted provided that the default bearer exists. The UE and the network set up the connection for the default bearer, reducing a delay caused because the UE does not set up a connection to the network until the UE receives or sends data. When a service request has a low requirement on a data packet latency, the UE usually transmits a data packet on the default bearer. If a user equipment initiates a request for a voice call or the like, because the default bearer cannot ensure requirements on a transmission latency, a packet loss rate, and the like, a dedicated bearer needs to be set up in this case. After the voice call is ended, the dedicated bearer is deleted, but the default bearer is always retained in a period in which the UE and the network are connected.

After a cellular mobile data switch is disabled, user equipment is unable to proactively initiate uplink data transmission, and therefore is unable to proactively send data to another device. After the cellular mobile data switch is disabled, a fourth generation (4G) switch on some user equipment may be in an enabled state. In this case, a user context on a unified packet gateway (UCG) device is still in an active state, and a network and the UE are still in a connected state. Therefore, a default bearer connected to a user is still available. In this case, if a UCG device receives a downlink packet, the UCG device forwards the downlink packet to the UE as usual, and a policy and charging enforcement function (PCEF) makes traffic-based charging normally for the transmitted downlink packet.

It can be learned that in the 3GPP standard protocol, a default bearer is set up provided that UE attaches to a network. As a result, when some users have disabled a cellular mobile data switch but have not disabled a 4G switch, a server still sends a downlink packet to UEs of these users through default bearers, and the PCEF charges normally for the packet, causing an increase in traffic fees of these users.

SUMMARY

Embodiments of this application provide a service data flow processing method and a related device, to process a service data flow generated on a default bearer when an uplink network connection is in an idle state, thereby reducing a data traffic fee corresponding to the service data flow.

A first aspect of the embodiments of this application provides a service data flow processing method, including:

obtaining, by a PCEF device, a service data flow, where the service data flow is a data flow sent by a server to a default bearer and is transmitted through the default bearer.

In this embodiment, the default bearer is a bearer set up when a PDN connection between the server and UE is in a connected state, and the default bearer persists provided that the PDN connection is not disconnected.

When the PCEF device determines that an uplink network connection between the UE and the server is in an idle state, the PCEF device processes the service data flow. A processing manner may be preventing sending of the service data flow or may be charging for the service data flow according to a preset charging mode. The preventing sending of the service data flow is not to charge for the service data flow, and the charging for the service data flow according to a preset charging mode can reduce a data traffic fee of the service data flow.

This embodiment of this application has the following advantages: The PCEF device obtains the service data flow transmitted through the default bearer, where the default bearer is a bearer set up when the PDN connection between the server and the UE is in a connected state. When the PCEF device determines that the uplink network connection between the UE and the server is in an idle state, the PCEF device prevents sending of the service data flow or the PCEF device charges for the service data flow according to the preset charging mode. In this embodiment, the PCEF determines a connection status between the UE and the server, and processes the service data flow when the PDN connection between the UE and the server is in a connected state but the uplink network connection is in a disconnected state, thereby reducing the data traffic fee.

According to the first aspect, in a first embodiment of the first aspect of the embodiments of this application, before the PCEF device determines that the uplink network connection between the UE and the server is in an idle state, the method further includes:

determining, by the PCEF device, whether the UE has generated an abnormal response; and performing, by the PCEF device after determining that the UE has generated an abnormal response, the step of determining that the uplink network connection is in an idle state.

This embodiment describes a manner in which the UE determines that the uplink network connection is in an idle state, improving implementability of the solution.

According to the first embodiment of the first aspect, in a second embodiment of the first aspect of the embodiments of this application, the determining, by the PCEF device, whether the UE has generated an abnormal response includes:

determining, by the PCEF device, whether the UE has initiated a request for disconnecting the PDN connection from the server; or determining, by the PCEF device, whether the UE does not generate a response to the service data flow within preset duration; and if either of the foregoing two cases is met, specifically, if the PCEF device determines that the UE has initiated a request for disconnecting the PDN connection from the server, or the PCEF device determines that the UE does not generate a response to the service data flow within the preset duration, determining, by the PCEF device, that the UE has generated an abnormal response.

This embodiment describes a manner in which the PCEF device determines that the UE has generated an abnormal response, improving flexibility of the solution.

According to the second embodiment of the first aspect, in a third embodiment of the first aspect of the embodiments of this application, before the determining, by the PCEF device, that the UE has generated an abnormal response, the method further includes:

determining, by the PCEF device, the preset duration based on at least one of an internet protocol IP address of the UE, port information of the UE, domain name information of the UE, and a communications protocol with which the UE complies.

This embodiment describes a manner in which the PCEF device determines the preset duration, improving practicability of the solution.

According to the first embodiment of the first aspect, in a fourth embodiment of the first aspect of the embodiments of this application, the determining, by the PCEF device, whether the UE has generated an abnormal response includes:

determining, by the PCEF device, whether a quantity of packets in the service data flow is greater than a threshold, because the service data flow can be used to transmit a packet, where in this embodiment, the threshold may be preset by the PCEF device.

If the PCEF device determines that the quantity of packets in the service data flow is greater than the threshold, and that the UE does not generate a response to the service data flow, or that the UE has initiated a request for disconnecting the PDN connection from the server, the PCEF device determines that the UE has generated an abnormal response.

This embodiment describes another manner in which the PCEF device determines that the UE has generated an abnormal response, improving flexibility of the solution.

According to the fourth embodiment of the first aspect, in a fifth embodiment of the first aspect of the embodiments of this application, before the determining, by the PCEF device, whether a quantity of packets in the service data flow is greater than a threshold, the method further includes:

determining, by the PCEF device, the threshold based on at least one of an internet protocol IP address of the UE, port information of the UE, domain name information of the UE, and a communications protocol with which the UE complies.

This embodiment describes a manner in which the PCEF device determines the threshold, improving practicability of the solution.

According to any of the first aspect and the first to the fifth embodiments of the first aspect, in a sixth embodiment of the first aspect of the embodiments of this application, a data traffic fee corresponding to the preset charging mode is less than a data traffic fee incurred when the PDN connection and the uplink network connection are in a connected state, thereby reducing the data traffic fee of the service data flow.

This embodiment describes the preset charging mode, improving implementability of the solution.

A second aspect of this application provides a policy and charging enforcement function PCEF device, including:

an obtaining module, which may be configured to obtain a service data flow, where the service data flow is a data flow sent by a server to user equipment UE through a default bearer, and the default bearer is a bearer set up when a public data network PDN connection between the server and the UE is in a connected state, and in this embodiment, the default bearer persists provided that the PDN connection is not disconnected;

a determining module, which may be configured to determine that an uplink network connection between the UE and the server is in an idle state; and a charging module, which may be configured to prevent sending of the service data flow, or charge for the service data flow according to a preset charging mode, where the preventing sending of the service data flow is not to charge for the service data flow, and the charging for the service data flow according to a preset charging mode can reduce a data traffic fee of the service data flow.

In this embodiment, the PCEF determines a connection status between the UE and the server, and processes the service data flow when the PDN connection between the UE and the server is in a connected state but the uplink network connection is in an idle state, thereby reducing the data traffic fee.

According to the second aspect, in a first embodiment of the second aspect, the PCEF device further includes:

a judging module, which may be configured to determine whether the UE has generated an abnormal response; and an execution module, which may be configured to: if the UE has generated an abnormal response, perform a step of determining that the uplink network connection between the UE and the server is in an idle state.

This embodiment describes a manner in which the UE determines that the uplink network connection is in an idle state, improving implementability of the solution.

According to the first embodiment of the second aspect, in a second embodiment of the second aspect, the judging module includes:

a first judging submodule, which may be configured to determine whether the UE has initiated a request for disconnecting the PDN connection from the server, or determine whether the UE does not generate a response to the service data flow within preset duration; and a first determining submodule, which may be configured to: if the first judging submodule determines that the UE has initiated a request for disconnecting the PDN connection from the server or that the UE does not generate a response to the service data flow within the preset duration, determine that the UE has generated an abnormal response.

This embodiment describes a manner in which the PCEF device determines that the UE has generated an abnormal response, improving flexibility of the solution.

According to the second embodiment of the second aspect, in a third embodiment of the second aspect of the embodiments of this application, the judging module further includes:

a second determining submodule, which may be configured to determine the preset duration based on at least one of an internet protocol IP address of the UE, port information of the UE, domain name information of the UE, and a communications protocol with which the UE complies.

This embodiment describes a manner in which the PCEF device determines the preset duration, improving practicability of the solution.

According to the second aspect, in a fourth embodiment of the second aspect, the judging module includes:

a second judging submodule, which may be configured to determine whether a quantity of packets in the service data flow is greater than a threshold; and a third determining submodule, which may be configured to: if the second judging submodule determines that the quantity of packets in the service data flow is greater than the threshold, and that the UE does not generate a response to the service data flow, or that the UE has initiated a request for disconnecting the PDN connection from the server, determine that the UE has generated an abnormal response, where in this embodiment, the threshold may be preset by the PCEF device.

This embodiment describes another manner in which the PCEF device determines that the UE has generated an abnormal response, improving flexibility of the solution.

According to the fourth embodiment of the second aspect, in a fifth embodiment of the second aspect, the judging module further includes:

a fourth determining submodule, which may be configured to determine the threshold based on at least one of an internet protocol IP address of the UE, port information of the UE, domain name information of the UE, and a communications protocol with which the UE complies.

This embodiment describes a manner in which the PCEF device determines the threshold, improving practicability of the solution.

A third aspect of this application provides a PCEF device, including a memory, a transceiver, a processor, and a bus system, where the memory is configured to store a program and an instruction;

the transceiver is configured to receive or send information under control of the processor;

the processor is configured to execute the program in the memory;

the bus system is configured to connect the memory, the transceiver, and the processor, so that the memory, the transceiver, and the processor communicate with each other; and the processor is configured to invoke the program and the instruction in the memory to perform the method according to any one of the first aspect of the application and the first to the sixth embodiments of the first aspect.

A fourth aspect of this application provides a computer readable storage medium, where the computer readable storage medium stores an instruction, and when the instruction is run on a computer, the computer is enabled to perform the method according to any of the foregoing aspects.

A fifth aspect of this application provides a computer program product including an instruction, where when the computer program product is run on a computer, the computer is enabled to perform the method according to any of the foregoing aspects.

DESCRIPTION OF EMBODIMENTS

In a second generation (2G) or third generation (3G) system, a circuit switched (CS) domain is mainly used for voice services and video services. In the circuit switched domain, a voice call occupies a channel exclusively, and the channel is released for use by another user until the call is ended. A packet switched (PS) domain is also a data switching domain, and is mainly responsible for data services (such as, for example, Internet surfing). The PS domain uses a packet forwarding mechanism in which a plurality of users share a channel resource, greatly improving resource utilization.

In a 4G system, that is, an LTE system, there is no CS domain but only a PS domain. In LTE, all voice services are performed in a voice of internet protocol (VoIP) manner. To be specific, the voice services are transferred over an IP network in real time in a form of an encapsulated data packet. Unlike in 2G and 3G, in the LTE system, a default bearer is further set up. The default bearer is a data radio bearer (DRB) that is set up by default by a core network for UE after a radio resource control (RRC) connection to the UE is set up and when an initial PDP context is set up. If the UE is connected only to a data switching domain, there is only one default bearer. If the UE is also connected to an IP multimedia subsystem (IMS), a dedicated bearer in a voice domain is further set up. A case related to an action (for example, initiating a voice call) of a user is as follows: When data transmission has a relatively high requirement, because the default bearer cannot ensure requirements on a transmission latency, a packet loss rate, and the like, a dedicated bearer further needs to be set up in this case.

Figure 1:
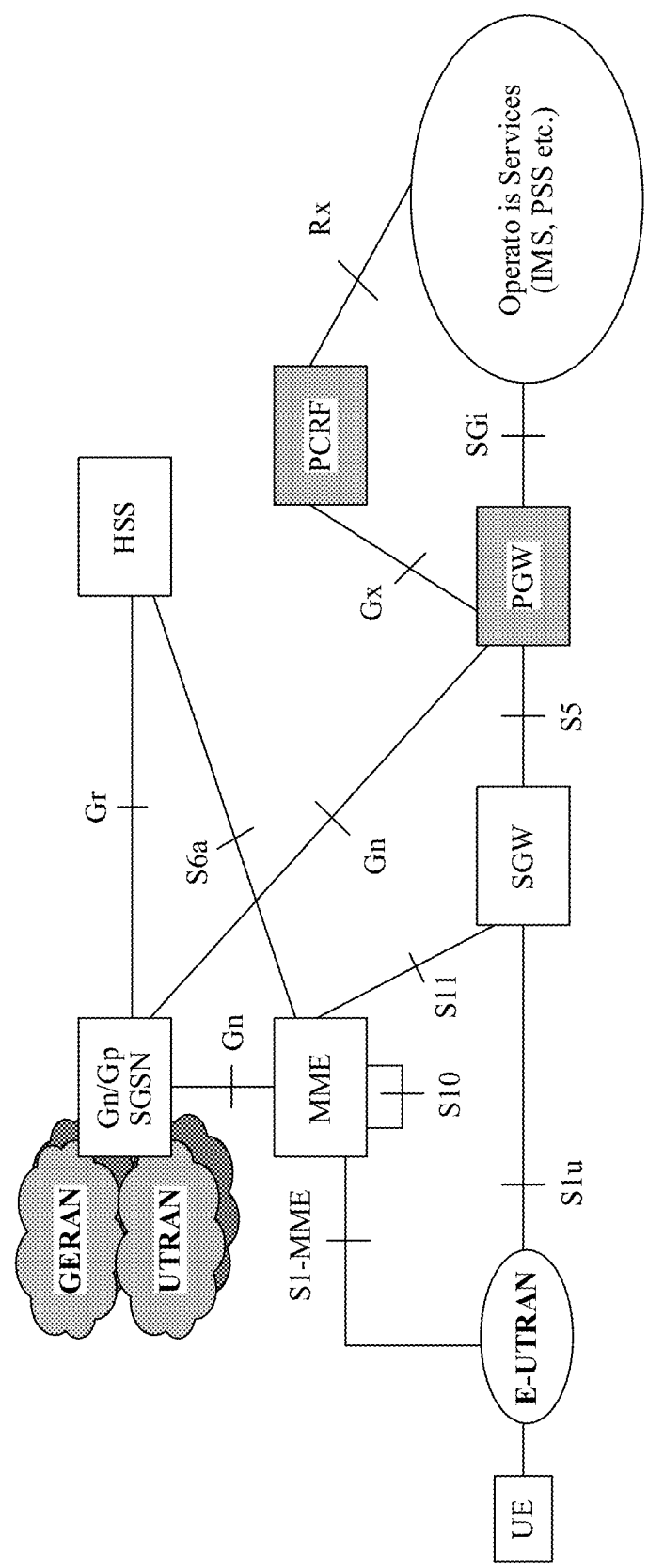
FIG. 1 is a composition structure diagram of an EPC of an existing LTE system.

FIG. 1 shows an EPC core network of an existing LTE system. The following first describes each network element briefly:

1. Functions of a mobility management entity (MME): mobility management, session management, user authentication and access, and the like.

2. Functions of a serving gateway (SGW): terminating an interface of a radio access portion, performing bearer setup and charging for a user, and re-sorting base stations during base station handover.

3. Packet data network gateway (referred to herein as PGW, PDN-GW, or the like): terminating a PDN-oriented SGi interface, making service-based charging, and connecting to an external gateway. The PGW may further allocate an IP address. Whether in 3GPP access or non-3GPP access, UE can access a PDN only by using a PGW network element. After a default bearer is set up, the PGW allocates an IP address to the UE, thereby providing the UE with a "permanently online" function. The PGW may serve as a PCEF device, to perform functions such as service data flow detection, policy enforcement, and flow-based charging.

4. Policy and charging rules function (PCRF) device: a point for deciding a policy and charging control policy for a service data flow and an IP bearer resource. The PCRF device selects and provides an available policy and charging control decision for a PCEF.

5. Home subscriber server (HSS): supporting a main user database of an IMS network entity that is configured to process an invocation and a session. The HSS includes a user configuration file, performs user identity authentication and authorization, and can provide information about a physical location of a user.

6. Serving GPRS support node (SGSN): configured to perform signaling interworking during movement between a 2G/3G access network and a 3GPP evolved universal mobile telecommunications system terrestrial radio access network (referred to as evolved UMTS terrestrial RAN, E-UTRAN, or the like) access network, including selecting a PGW and an SGW and also selecting an MME for a user handed over to the 3GPP E-UTRAN access network.

An access network E-UTRAN includes a base station.

A signaling interworking process shown in the figure is as follows: The UE is connected to the evolved packet core (EPC) via the base station, signaling is forwarded to the MME via an S1-MME interface, the MME performs user registration and authentication, and the HSS determines user validity. The MME sends a message requesting to set up the default bearer to the SGW via an S11 interface. The SGW obtains, through parsing on a domain name system (DNS) by using an access point name (APN), a PGW of the default bearer. The SGW sends the message to the PGW through an S5 interface. The PGW is connected to a PCRF through a Gx interface, and the PCRF authenticates a user request and allocates a charging policy. The PCRF allocates the charging policy to the PCEF for charging. The UE is connected to the SGW through an S1-U interface, and the SGW performs bearer setup and charging for the user. The PGW accesses an operator network via the SGi interface. By using this connection manner, charging for a service data flow between the UE and a server can be made.

In a 2G or 3G system, a default bearer is not set up, and therefore the disadvantage addressed by the embodiments of this application does not exist. This application is mainly intended for an LTE system. However, the disadvantage addressed by the embodiments of this application also exists in a 5G network besides a 4G network. It should be noted that, regardless of a type of a network system, provided that a default bearer is set up between UE and a server, the server can still transmit data by using the default bearer even if an uplink network connection of the UE is disabled.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

An embodiment of this application provides a service data flow processing method. The method is used by a PCEF device to process a service data flow when an uplink network connection between UE and a server is in an idle state.

In this embodiment, the PCEF device is a unit on a network device, and mainly provides functions such as service data flow detection, policy enforcement, and service data flow-based charging.

201. The policy and charging enforcement function PCEF device obtains the service data flow.

In a process in which the server transmits the service data flow to the UE, the service data flow passes the PCEF device and is then forwarded to the UE, and the PCEF device may charge for the service data flow.

A PCEF is connected between the UE and the server, and forwards the service data flow.

In this embodiment, the service data flow is sent through a default bearer. The default bearer is a bearer set up when a PDN connection between the server and the UE is in a connected state. When a 4G switch on the UE is enabled, as described above, provided that the UE sets up the PDN connection to the server and then sets up the default bearer, the server can send data to the UE. In this case, a generated service data flow is also obtained by the PCEF device and is charged for.

In this embodiment, the PDN connection needs to be set up before the default bearer is set up between the UE and the server. A purpose of setting up the PDN connection is to set up one default bearer for one PDN. First, the UE sends a PDN connection request message to the server, where the message may be included in an attach message to set up a first default bearer, or may not be included in an attach message but is sent as an independent message. This is not specifically limited herein.

In this embodiment, a process of setting up the default bearer is specifically as follows: 1. If the process of setting up the default bearer is a part of an attach procedure, an MME sends an activate default EPS bearer context request message and an attach accept message to the UE. If the attach procedure fails, the UE implicitly considers that a process of activating the default bearer also fails. 2. If the process of setting up the default bearer is not a part of the attach procedure but independently serves as a response to the PDN connection request, the MME sends an activate default EPS bearer context request message to the UE.

A purpose of sending, by the UE, a message requesting to disconnect a PDN connection is to disconnect the PDN connection. Then, all EPS bearer contexts set up by the UE need to be released. A specific process is as follows: The UE sends a PDN connection disconnect request to the MME, where the message includes an EPS bearer identifier of a default bearer of a PDN. After receiving the message, the MME sends, to the UE, a message (including an identifier of the default bearer of the PDN) requesting to disconnect an EPS bearer connection, to start a process of deactivating the EPS bearer contexts.

In this embodiment of this application, the default bearer is disconnected only when the PDN connection is released. Otherwise, the default bearer persists. If one UE is connected to a plurality of PDNs, a default bearer needs to be set up for each PDN. The process of deactivating the EPS bearer (including default bearer) contexts is to deactivate an EPS context bearer or disconnect the PDN connection (where a manner of disconnecting the PDN connection is to deactivate all the EPS bearer contexts of the PDN). The process is initiated by a base station, but may be requested or triggered by the UE by using some procedures. For example, the UE requests a bearer modification procedure or the UE requests a PDN connection disconnect procedure.

In this embodiment, the UE further needs to obtain a default bearer resource allocated by the base station. The base station may allocate the default bearer to the UE by using signaling, such as RRC signaling, physical layer signaling, or media access control (MAC) layer signaling.

In this embodiment, a manner in which the base station may allocate the default bearer to the UE by using the signaling may be as follows: The signaling carries information about a parameter, where the parameter indicates information about a frequency domain resource occupied by a channel resource corresponding to the default bearer.

In this embodiment, the PCEF executes a charging enforcement policy sent by the PCRF, and charges for the service data flow according to the policy.

In this embodiment, a network architecture of a core network is similar to that in prior systems, such as those described above. Details are not described herein again.

In this embodiment, the service data flow sent by the server to the UE through the default bearer can also be received by the UE, but the UE does not generate a normal response to the service data flow.

202. The PCEF device determines that the uplink network connection between the UE and the server is in an idle state.

In this embodiment, when the uplink network connection between the UE and the server is in an idle state, the UE can still receive the service data flow sent by the server. However, in this state, the UE does not proactively send data to the server, and does not generate a normal response to the service data flow sent by the server either. For example, the UE does not send a data packet to the server according to a handshake protocol, where the data packet is used to notify the server that UE has successfully received the service data flow.

In this embodiment, the uplink network connection may be a mobile network connection. Mobile network connections may have different names on different user equipment. For example, a mobile network connection is referred to as cellular mobile data on an Apple mobile phone, and is referred to as mobile data on Huawei and Samsung mobile phones. Therefore, the mobile network connection in this embodiment has different names on different devices, but implements a similar function as the uplink network connection in this embodiment of this application. No more examples are specifically listed herein.

203. The PCEF device prevents sending of the service data flow, or the PCEF device charges for the service data flow according to a preset charging mode.

In this embodiment of this application, processing the service data flow by the PCEF device includes preventing sending of the service data flow, or making special charging for the service data flow. The preventing sending of the service data flow means that the PCEF device does not charge for the service data flow. When special charging is made for the service data flow, a data traffic fee incurred by the special charging is less than a data traffic fee incurred when both the PDN connection and the uplink network connection are in a connected state. For example, a data traffic fee incurred when only the 4G switch is enabled is less than a data traffic fee incurred when both a cellular mobile data switch and the 4G switch are enabled.

In this embodiment of this application, the service data flow sent by the server to the UE when the PDN connection is a connected state but the uplink network connection is in an idle state an idle state is processed, to reduce a data traffic fee corresponding to the service data flow, thereby reducing or remitting a traffic fee for a user when the uplink network connection is in an idle state an idle state.

Figure 3:
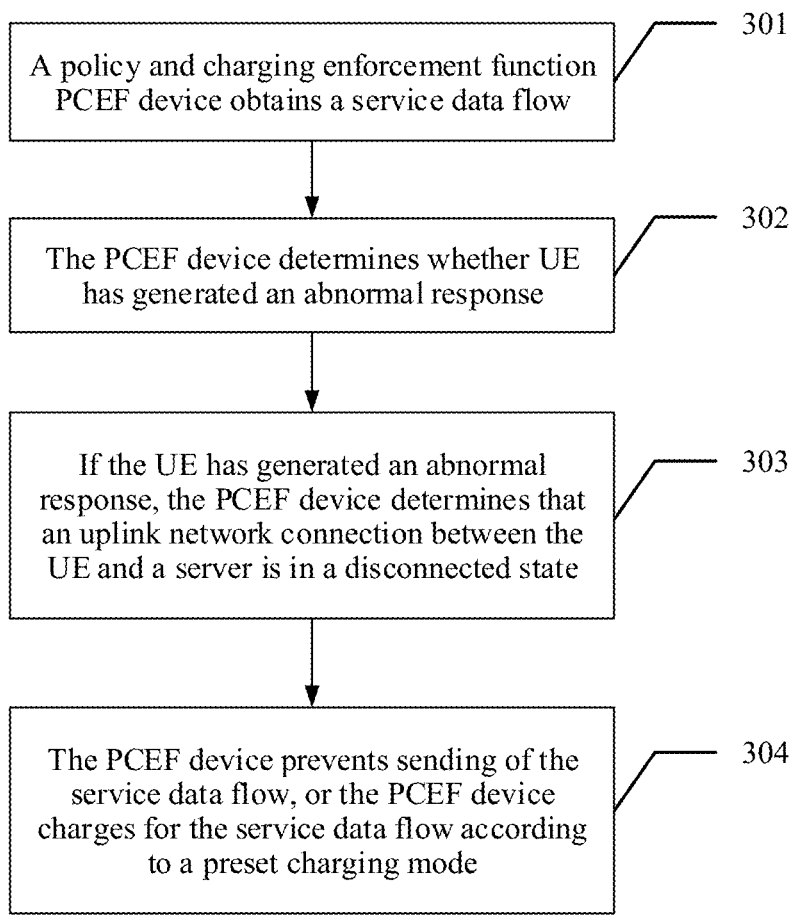
FIG. 3 shows another service data flow processing method according to an embodiment of this application.

In this embodiment, the PCEF device may determine, by determining whether the UE generates an abnormal response to the service data flow, whether the uplink network connection of the UE is in an idle state. Referring to FIG. 3, details are described below.

301. A policy and charging enforcement function PCEF device obtains a service data flow.

The embodiment step 301 in this embodiment of this application is similar to the embodiment step 201. Details are not described herein again.

302. The PCEF device determines whether UE has generated an abnormal response.

In this embodiment, two manners are available for the PCEF device to determine whether the UE has generated an abnormal response. The manners are described below.

I. In a process of monitoring data exchange between the UE and a server, the PCEF device detects that: 1. the UE has initiated a request for disconnecting a PDN connection from the server; or 2. the UE does not generate a response to the service data flow within preset duration.

When either of the foregoing two cases is met, the PCEF device determines that the UE has generated an abnormal response.

It can be understood that besides the foregoing two cases, there may also be other cases in which the UE may be considered as having generated an abnormal response. This is not specifically limited herein.

In this embodiment, the preset duration may be determined based on at least one of an internet protocol IP address of the UE, port information of the UE, domain name information of the UE, and a communications protocol with which the UE complies.

Specifically, different IP addresses (or applications) may have different behavioral characteristics, and need to be processed differently. The PCEF device determines information about cells serving UEs and a channel status of the UEs and distinguishes between different UEs based on IP addresses of the UEs, and allocates different preset duration based on the different IP addresses.

Similarly, the server allocates different ports and domain names to different UEs, and the PCEF device allocates different preset duration to the different UEs based on the different ports and domain names.

Similarly, the PCEF device may alternatively allocate different preset duration to different UEs based on communications protocols with which the UEs comply. In this embodiment, the communications protocol may be an L34 protocol.

II. The PCEF device determines whether a quantity of packets in the service data flow is greater than a first threshold. If yes, and the UE does not generate a response to the service data flow, or the UE has initiated a request for disconnecting the PDN connection from the server, the PCEF device determines that the UE has generated an abnormal response.

In this manner, the first threshold may be determined based on at least one of an internet protocol IP address of the UE, port information of the UE, domain name information of the UE, and a communications protocol with which the UE complies.

Specifically, different IP addresses (or applications) may have different behavioral characteristics, and need to be processed differently. The PCEF device determines information about cells serving UEs and a channel status of the UEs and distinguishes between different UEs based on IP addresses of the UEs, and allocates different first thresholds based on the different IP addresses.

Similarly, the server allocates different ports and domain names to different UEs, and the PCEF device allocates different first thresholds to the different UEs based on the different ports and domain names.

Similarly, the PCEF device may alternatively allocate first thresholds to different UEs based on communications protocols with which the UEs comply. In this embodiment, the communications protocol may be an L34 protocol.

In this embodiment, in a process in which the PCEF device determines whether the UE has generated a normal response, before a result of the determining is obtained, the PCEF device may limit a quantity of the service data flow, to minimize a data traffic fee corresponding to the service data flow.

In this embodiment, after determining that the UE has generated an abnormal response to the service data flow, the PCEF device may store a server IP list of the service data flow. If a service data flow initiated by the server subsequently matches the list, the service data flow is directly determined as an abnormal service data flow and is processed, to reduce a data traffic fee corresponding to the service data flow, without a need to determine whether the UE has generated an abnormal response.

303. If the UE has generated an abnormal response, the PCEF device determines that the uplink network connection between the UE and the server is in an idle state.

The uplink network connection in this embodiment is similar to the uplink network connection in the embodiment step 202. Details are not described herein again.

304. The PCEF device prevents sending of the service data flow, or the PCEF device charges for the service data flow according to a preset charging mode.

The embodiment step 304 in this embodiment of this application is similar to the embodiment step 202. Details are not described herein again.

In this embodiment, when the UE has generated an abnormal response, it is determined that the uplink network connection between the server and the UE is in an idle state, and several cases concerning the abnormal response are analyzed, improving implementability of the solution.

Figure 4:
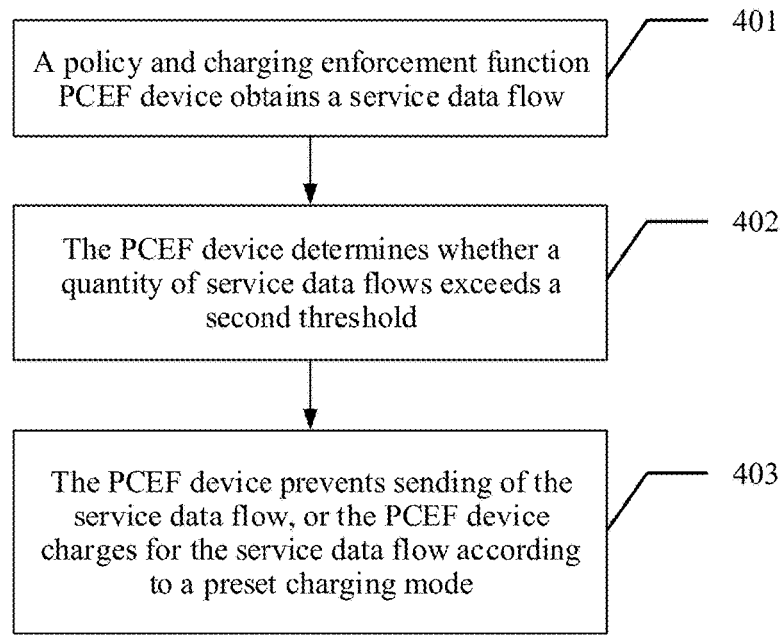
FIG. 4 shows another service data flow processing method according to an embodiment of this application.

In an embodiment of this application, output ports of service data flows initiated proactively by a service server change constantly, to avoid determining an abnormal response status of UE. Therefore, an embodiment of this application further proposes another service data flow processing method, in which whether the UE has generated an abnormal response is not determined and only an additional limitation is imposed on a service data flow. Referring to FIG. 4, details are provided below.

401. A PCEF device obtains a service data flow.

A step performed by the step 401 is similar to the embodiment step 201. Details are not described herein again.

402. The PCEF device determines whether a quantity of service data flows exceeds a second threshold.

In this embodiment, when there are a plurality of service data flows, that is, a server initiates a plurality of service data flows to UE, the PCEF device determines whether the quantity of service data flows exceeds the second threshold.

403. The PCEF device prevents sending of the service data flow, or the PCEF device charges for the service data flow according to a preset charging mode.

In this embodiment, when the quantity of service data flows exceeds the second threshold, the PCEF device processes the service data flow. A processing manner is similar to that in the embodiment step 202, and may be preventing sending of the service data flow or making special charging for the service data flow. Details are not described herein again.

In this embodiment, a quantity of service data flows concurrently initiated by the server is limited, thereby limiting service data flows proactively initiated by the server. This prevents a huge phone bill caused by traffic of a malicious tool.

Figure 2:
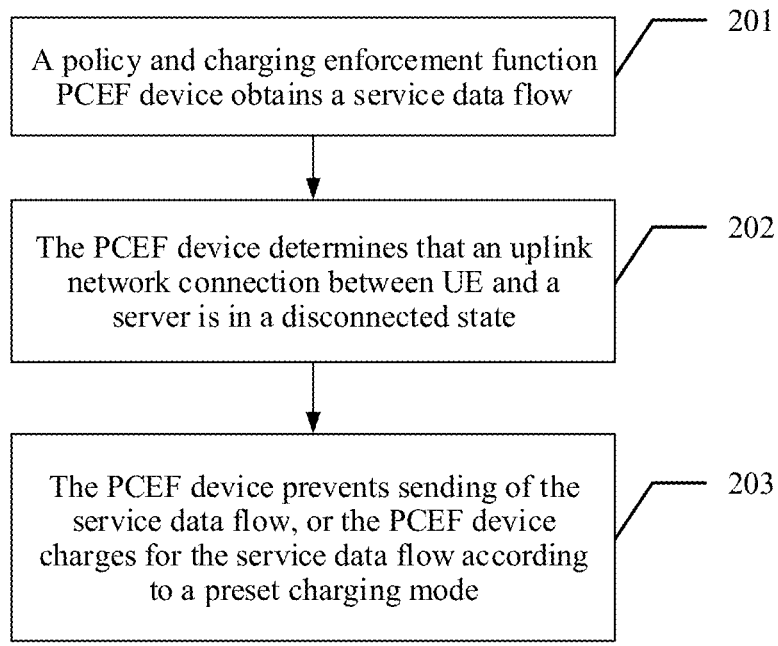
FIG. 2 shows a service data flow processing method according to an embodiment of this application.
Figure 5:
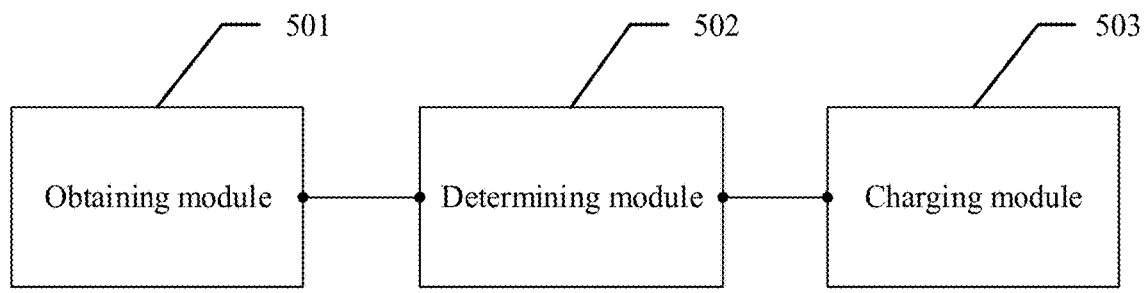
FIG. 5 is a schematic diagram of an embodiment of a PCEF device according to an embodiment of this application.

The foregoing describes the embodiments of this application from a perspective of the service data flow processing method with reference to FIG. 2 to FIG. 4. Referring to FIG. 5, the following describes the embodiments of this application from a perspective of a PCEF device.

An obtaining module 501 is configured to obtain a service data flow, where the service data flow is a data flow sent by a server to user equipment UE through a default bearer, and the default bearer is a bearer set up when a public data network PDN connection between the server and the UE is in a connected state.

A determining module 502 is configured to determine that an uplink network connection between the UE and the server is in an idle state.

A charging module 503 is configured to prevent sending of the service data flow, or charge for the service data flow according to a preset charging mode.

In this embodiment of this application, the service data flow sent by the server to the UE when the PDN connection is a connected state but the uplink network connection is in an idle state is processed, to reduce a data traffic fee corresponding to the service data flow, thereby reducing or remitting a traffic fee for a user when the uplink network connection is in an idle state.

Figure 6:
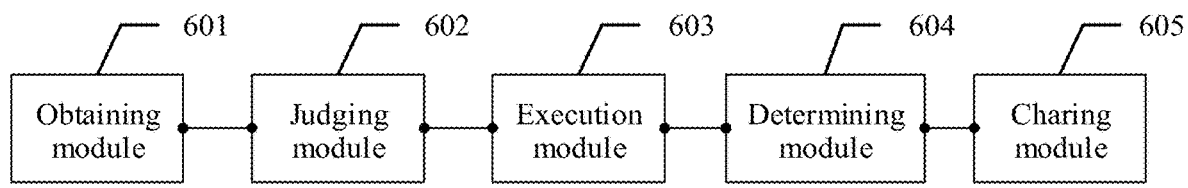
FIG. 6 is a schematic diagram of another embodiment of a PCEF device according to an embodiment of this application.

In this embodiment, a manner in which a PCEF device determines that the uplink network connection between the UE and the server is in an idle state is to determine whether the UE has generated an abnormal response. Referring to FIG. 6, the following provides descriptions.

An obtaining module 601 is configured to obtain a service data flow, where the service data flow is a data flow sent by a server to user equipment UE through a default bearer, and the default bearer is a bearer set up when a public data network PDN connection between the server and the UE is in a connected state.

A judging module 602 is configured to determine whether the UE generates an abnormal response.

An execution module 603 is configured to: if the UE has generated an abnormal response, perform a step of determining that the uplink network connection between the UE and the server is in an idle state.

A determining module 604 is configured to determine that the uplink network connection between the UE and the server is in an idle state.

A charging module 605 is configured to prevent sending of the service data flow, or charge for the service data flow according to a preset charging mode.

In this embodiment, the UE determines, by determining whether the UE generates an abnormal response, whether the uplink network connection is in an idle state, thereby improving implementability of the solution.

Figure 7:
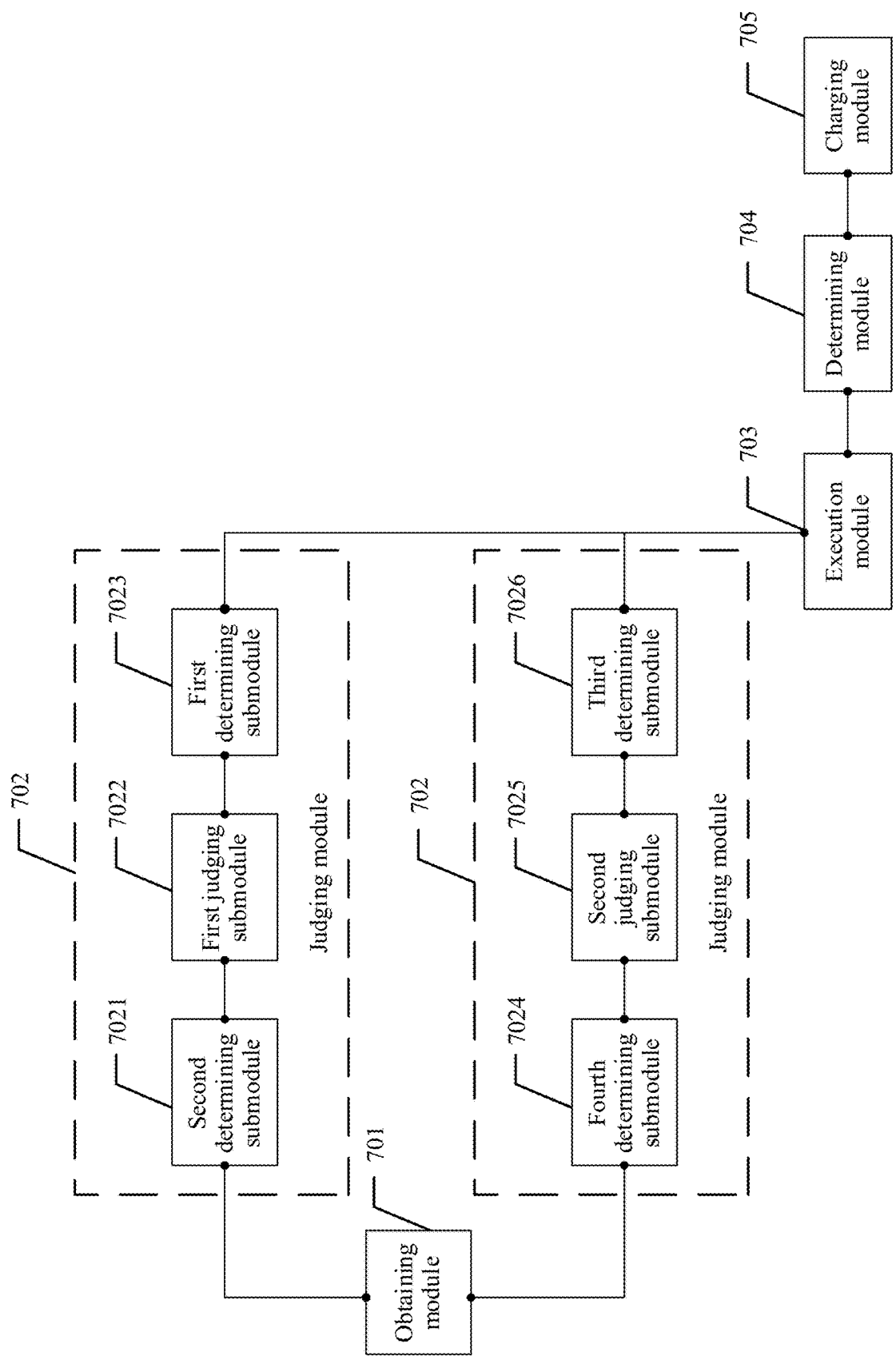
FIG. 7 is a schematic diagram of another embodiment of a PCEF device according to an embodiment of this application.

In this embodiment, there are a plurality of specific manners for determining whether the UE generates an abnormal response. Referring to FIG. 7, the following describes two cases.

An obtaining module 701 is configured to obtain a service data flow, where the service data flow is a data flow sent by a server to user equipment UE through a default bearer, and the default bearer is a bearer set up when a public data network PDN connection between the server and the UE is in a connected state.

A judging module 702 is configured to determine whether the UE generates an abnormal response.

An execution module 703 is configured to: if the UE has generated an abnormal response, perform a step of determining that an uplink network connection between the UE and the server is in an idle state.

A determining module 704 is configured to determine that the uplink network connection between the UE and the server is in an idle state.

A charging module 705 is configured to prevent sending of the service data flow, or charge for the service data flow according to a preset charging mode.

1. In a process in which a PCEF device monitors data exchange between the UE and the server, first, the PCEF device detects that the UE initiates a request for disconnecting a PDN connection from the server; and second, the PCEF device checks whether the UE does not respond to the service data flow within preset duration.

The judging module 702 includes:

a first judging submodule 7022, configured to: determine whether the UE has initiated the request for disconnecting the PDN connection from the server, or determine whether the UE does not generate a response to the service data flow within the preset duration; and a first determining submodule 7023, configured to: if the first judging submodule 7021 determines that the UE has initiated the request for disconnecting the PDN connection from the server or that the UE does not generate a response to the service data flow within the preset duration, determine that the UE has generated an abnormal response.

The judging module further includes:

a second determining submodule 7021, configured to determine the preset duration based on at least one of an internet protocol IP address of the UE, port information of the UE, domain name information of the UE, and a communications protocol with which the UE complies.

2. The PCEF device determines whether a quantity of packets in the service data flow is greater than a first threshold; and if the quantity of packets in the service data flow is greater than the first threshold and the UE does not respond to the service data flow or the UE initiates a request for disconnecting the PDN connection from the server, the PCEF device determines that the UE generates an abnormal response.

The judging module 702 includes:

a second judging submodule 7025, configured to determine whether a quantity of packets in the service data flow is greater than a threshold; and a third determining submodule 7026, configured to: if the second judging submodule 7023 determines that the quantity of packets in the service data flow is greater than the threshold, and that the UE does not generate a response to the service data flow, or that the UE has initiated a request for disconnecting the PDN connection from the server, determine that the UE has generated an abnormal response.

The judging module further includes:

a fourth determining submodule 7024, configured to determine the threshold based on at least one of an internet protocol IP address of the UE, port information of the UE, domain name information of the UE, and a communications protocol with which the UE complies.

Figure 8:
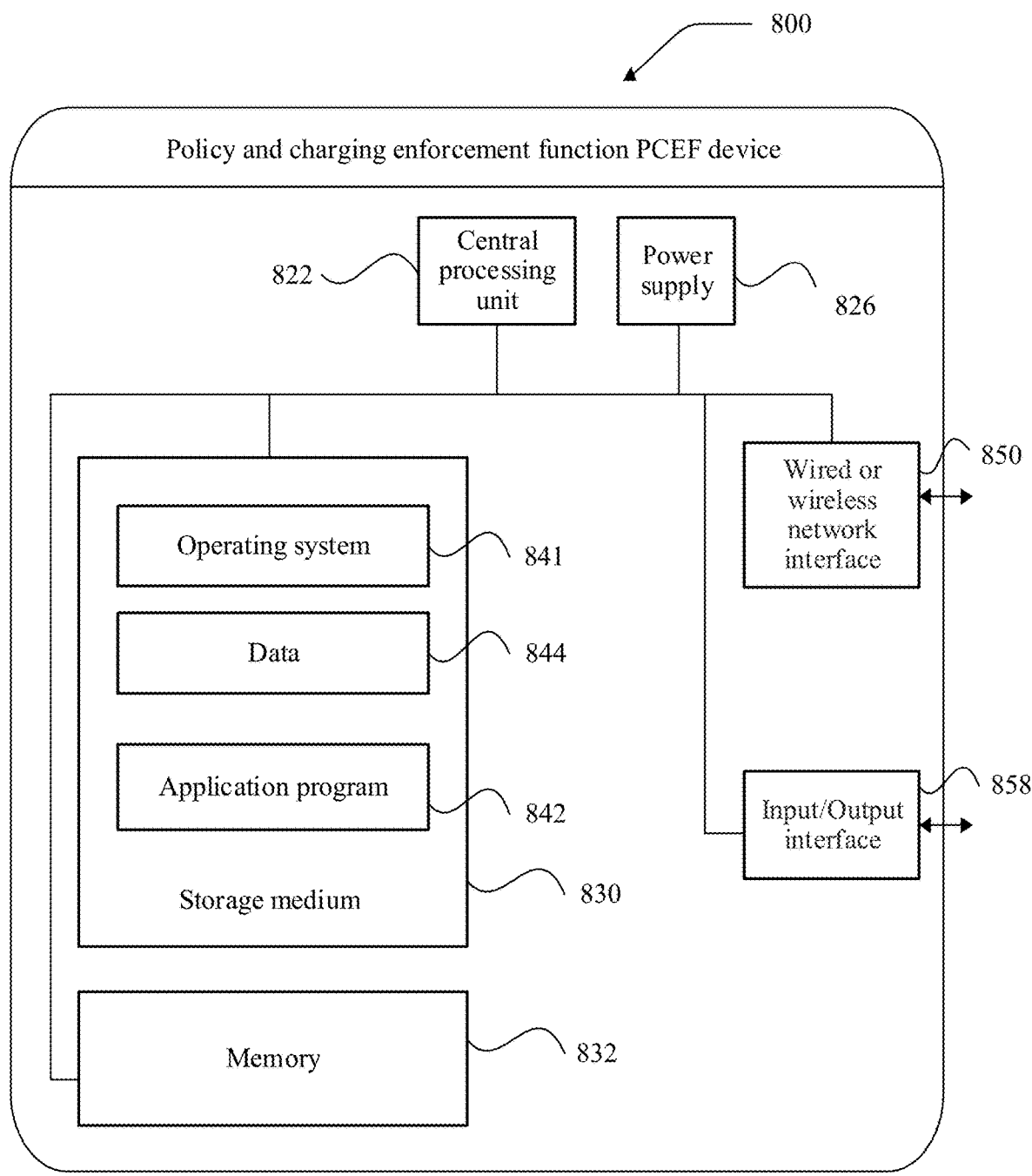
FIG. 8 is a structural diagram of an entity of a PCEF device according to an embodiment of this application.

FIG. 8 is a schematic diagram of a PCEF device according to an embodiment of this application. The PCEF device 800 includes a browser. The PCEF device 800 may vary greatly due to different configurations or performance, and may include one or more central processing units (central processing units, CPU) 822 (for example, one or more processors), a memory 832, and one or more storage media 830 (for example, one or more large-capacity storage devices) that store an application program 842 or data 844. The memory 832 and the storage medium 830 may be transient storage or persistent storage. The program stored in the storage medium 830 may include one or more modules (not shown in the figure), and each module may include a series of instruction operations for the PCEF device. Further, the central processing unit 822 may be configured to: communicate with the storage medium 830, and perform, on the PCEF device 800, a series of instruction operations in the storage medium 830.

The central processing unit 822 may perform the following steps according to the instruction operations:

obtaining a service data flow, where the service data flow is a data flow sent by a server to user equipment UE through a default bearer, and the default bearer is a bearer set up when a public data network PDN connection between the server and the UE is in a connected state;

determining that the uplink network connection between the UE and the server is in an idle state; and preventing sending of the service data flow, or charging for the service data flow according to a preset charging mode.

The PCEF device 800 may further include one or more power supplies 826, one or more wired or wireless network interfaces 850, one or more input/output interfaces 858, and/or one or more operating systems 841, for example, Windows Server™, Mac OS X™, and Unix™, Linux™, FreeBSD™, and the like.

In the foregoing embodiment, the PCEF device may perform based on the structure of the PCEF device shown in FIG. 8.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division(s) in actual implementation(s). For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a local client, a network device, or the like) to perform all or some of the steps of the methods described in the embodiments shown in FIG. 2 to FIG. 4. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A service data flow processing method, comprising:
   obtaining, by a policy and charging enforcement function (PCEF) device, a service data flow, wherein the service data flow is a data flow sent by a server to user equipment (UE) through a default bearer, and the default bearer is a bearer set up when a public data network (PDN) connection between the server and the UE is in a connected state;
   determining, by the PCEF device, whether the UE has generated an abnormal response to the service data flow based at least in part on whether the UE has initiated a request for disconnecting the PDN connection from the server;
   determining, by the PCEF device, that an uplink network connection between the UE and the server is in an idle state when the UE is determined by the PCEF device to have generated the abnormal response; and
   preventing, by the PCEF device when the uplink network connection between the UE and the server is determined to be in the idle state, sending of the service data flow, or charging, by the PCEF device, for the service data flow according to a preset charging mode.

2. The method according to claim 1, wherein the determining, by the PCEF device, whether the UE has generated the abnormal response further comprises:
   determining, by the PCEF device, whether the UE does not generate a response to the service data flow within a preset duration; and
   determining, by the PCEF device, that the UE has generated the abnormal response when the UE has initiated the request for disconnecting the PDN connection from the server, the UE does not generate a response to the service data flow within preset duration, or a combination thereof are determined.

3. The method according to claim 2, wherein before the determining, by the PCEF device, that the UE has generated the abnormal response, the method further comprises:
   determining, by the PCEF device, the preset duration based on at least one of an internet protocol (IP) address of the UE, port information of the UE, domain name information of the UE, and a communications protocol with which the UE complies.

4. The method according to claim 1, wherein the determining, by the PCEF device, whether the UE has generated the abnormal response further comprises:
   determining, by the PCEF device, whether a quantity of packets in the service data flow is greater than a threshold; and
   when the quantity of packets in the service data flow is greater than the threshold, the UE does not generate a response to the service data flow, or the UE has initiated a request for disconnecting the PDN connection from the server, determining, by the PCEF device, that the UE generates the abnormal response.

5. The method according to claim 4, wherein before the determining, by the PCEF device, whether the quantity of packets in the service data flow is greater than the threshold, the method further comprises:
   determining, by the PCEF device, the threshold based on at least one of an internet protocol (IP) address of the UE, port information of the UE, domain name information of the UE, and a communications protocol with which the UE complies.

6. The method according to claim 1, wherein a data traffic fee corresponding to the preset charging mode is less than a data traffic fee incurred when the PDN connection and the uplink network connection are in a connected state.

7. A non-transitory machine readable storage medium storing instructions, which when executed by a policy and charging enforcement function (PCEF) device comprising at least one processor configured to execute the instructions, cause the PCEF device to perform operations, comprising:
   obtaining a service data flow, wherein the service data flow is a data flow sent by a server to user equipment (UE) through a default bearer, and the default bearer is a bearer set up when a public data network (PDN) connection between the server and the UE is in a connected state;
   determining whether the UE has generated an abnormal response to the service data flow based at least in part on whether the UE has initiated a request for disconnecting the PDN connection from the server;
   determining that an uplink network connection between the UE and the server is in an idle state when the UE is determined to have generated the abnormal response; and
   preventing, when the uplink network connection between the UE and the server is determined to be in the idle state, sending of the service data flow, or charge for the service data flow according to a preset charging mode.

8. The non-transitory machine readable storage medium according to claim 7, the operations further comprising:
   determining whether the UE does not generate a response to the service data flow within a preset duration; and
   when the UE has initiated the request for disconnecting the PDN connection from the server or the UE does not generate a response to the service data flow within the preset duration are determined, determining that the UE has generated the abnormal response.

9. The non-transitory machine readable storage medium according to claim 8, wherein the operations comprise:
   determining the preset duration based on at least one of an internet protocol (IP) address of the UE, port information of the UE, domain name information of the UE, and a communications protocol with which the UE complies.

10. The non-transitory machine readable storage medium according to claim 7, the operations further comprising:
    determining whether a quantity of packets in the service data flow is greater than a threshold; and
    when the quantity of packets in the service data flow is greater than the threshold, and that the UE does not generate a response to the service data flow, or that the UE has initiated a request for disconnecting the PDN connection from the server, determine that the UE has generated the abnormal response.

11. The non-transitory machine readable storage medium according to claim 10, the operations further comprise:
    determining the threshold based on at least one of an internet protocol (IP) address of the UE, port information of the UE, domain name information of the UE, and a communications protocol with which the UE complies.

12. A PCEF device, comprising:
    a memory configured to store a program and an instruction;
    a transceiver configured to receive or send information under control of a processor;
    the processor configured to execute the program in the memory;
    a bus system configured to communicatively couple the memory, the transceiver, and the processor, so that the memory, the transceiver, and the processor are in communication with each other; and
    the processor further configured to invoke the program and instruction in the memory, to perform operations comprising:
    obtaining a service data flow, wherein the service data flow is a data flow sent by a server to user equipment (UE) through a default bearer, and the default bearer is a bearer set up when a public data network (PDN) connection between the server and the UE is in a connected state,
    determining whether the UE has generated an abnormal response to the service data flow based at least in part on whether the UE has initiated a request for disconnecting the PDN connection from the server,
    determining that an uplink network connection between the UE and the server is in an idle state when the UE is determined to have generated the abnormal response, and
    preventing, when the uplink network connection between the UE and the server is determined to be in the idle state, sending of the service data flow, or charging for the service data flow according to a preset charging mode.

* * * * *